No. 733,875. PATENTED JULY 14, 1903.
H. SCHARBAU.
GRINDING MILL.
APPLICATION FILED OCT. 3, 1902.
NO MODEL.

Witnesses:

Inventor:

No. 733,875. Patented July 14, 1903.

UNITED STATES PATENT OFFICE.

HERMANN SCHARBAU, OF MAGDEBURG, GERMANY.

GRINDING-MILL.

SPECIFICATION forming part of Letters Patent No. 733,875, dated July 14, 1903.

Application filed October 3, 1902. Serial No. 125,760½. (No model.)

*To all whom it may concern:*

Be it known that I, HERMANN SCHARBAU, engineer, a subject of the German Emperor, and a resident of Magdeburg, Germany, have invented new and useful Improvements in Grinding-Mills, of which the following is a specification.

This invention relates to grinding-mills in which a pendulum is used. The construction of such mills is improved in such a manner that between the driving-pulley and the pendulum suspended in a ball-bearing helical springs are inserted, in connection with the cross-piece of the pendulum, to replace a universal joint as used at present.

Figure 1:
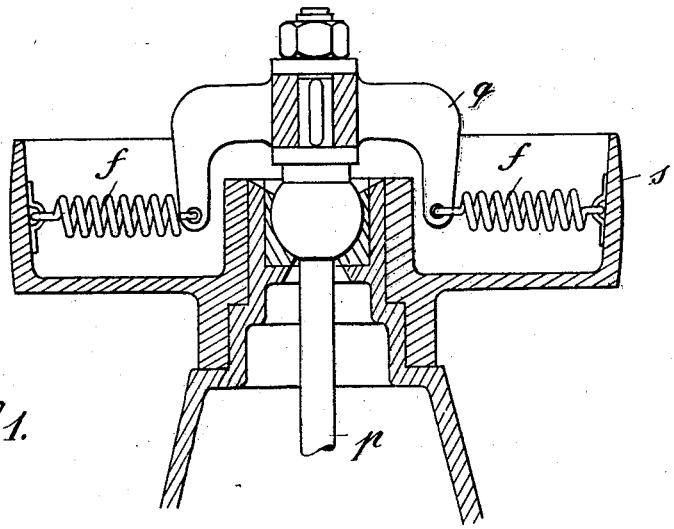
Figure 2:
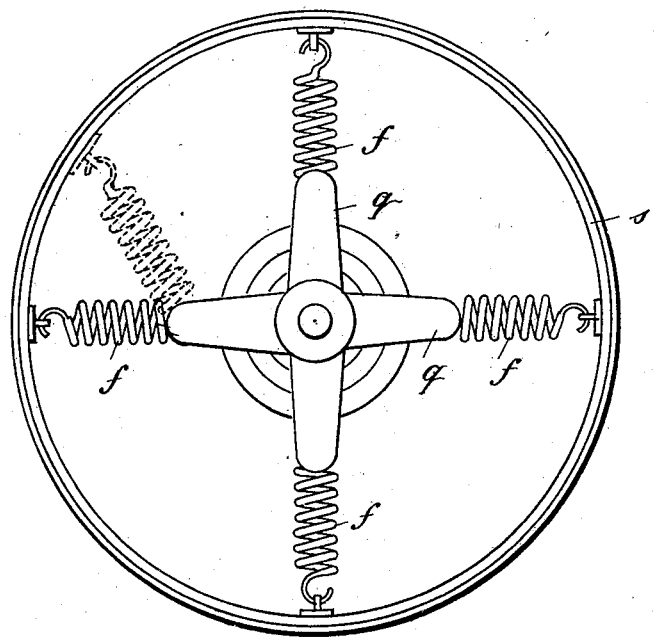

In the accompanying drawings the driving-pulley with the head of the pendulum is shown in Figure 1 in a vertical section and in Fig. 2 in a plan view.

The pulley $s$ is connected with the cross-piece $q$ of the pendulum $p$ by means of helical springs $f$, which are arranged in pairs, so that if the pulley is rotated the pendulum receives a rotating movement around its own axis. If the pendulum $p$ is brought out of its vertical position, the pendulum is pressed against the grinding-surface in consequence of the centrifugal action and rolls along the grinding-surface in a direction opposite to that in which the pulley rotates.

The head of the pendulum $p$ is provided with a ball $k$, resting in a ball-bearing in the frame of the grinding-machine, and to the head of the pendulum above the ball $k$ the cross-piece $q$ is securely fixed. The ball-bearing can be either rigidly connected with the frame or adapted to rotate with the pulley $s$.

The helical springs $f$ in connection with this ball-bearing act as a cross-joint, because they are prolonged or shortened, according to the position of the pendulum. Besides, the shocks and vibrations of the grinding-mill are reduced by the helical springs $f$, which are arranged in such a manner that the tension of the springs as well as the length of the lever acting on the pendulum alter according to the resistance of impetus. Instead of the traction-springs pressure-springs or pressure and traction springs combined could be used.

Having fully described my invention, what I claim, and desire to secure by Letters Patent, is—

Improved grinding-mill comprising in combination with the usual pulley and pendulum a ball at the upper end of the pendulum resting in a ball-bearing in the frame of the machine, a cross-head fixed to the upper end of the pendulum and helical springs between the ends of the cross-head and the inner surface of the pulley, substantially as described and shown and for the purpose set forth.

In testimony whereof I have hereunto set my hand in presence of two subscribing witnesses.

HERMANN SCHARBAU.

Witnesses:
 RICHARD MEUMANN,
 L. MEUMANN.